United States Patent [19]
Lehmann

[11] Patent Number: 5,764,025
[45] Date of Patent: Jun. 9, 1998

[54] VEHICLE BATTERY

[76] Inventor: Robert J. Lehmann, W. 222 N. 8399 Plainview Pkwy., Sussex, Wis. 53089

[21] Appl. No.: 714,454

[22] Filed: Sep. 16, 1996

[51] Int. Cl.$^6$ .................. H02J 7/00; H01M 2/10
[52] U.S. Cl. ........................... 320/2; 420/100
[58] Field of Search ............... 320/2; 429/98–100; D13/103–106

[56] References Cited

U.S. PATENT DOCUMENTS

| | | | |
|---|---|---|---|
| 3,529,229 | 9/1970 | Kennedy | 320/2 |
| 4,624,335 | 11/1986 | Shiraishi et al. | 180/142 |
| 4,783,619 | 11/1988 | Herman | 320/2 |
| 5,150,045 | 9/1992 | Nagano et al. | 320/2 |
| 5,168,206 | 12/1992 | Jones | 320/5 |
| 5,194,799 | 3/1993 | Tomantschager | 320/2 |
| 5,352,966 | 10/1994 | Irons | 320/3 |
| 5,607,794 | 3/1997 | Koenig | 426/100 |

Primary Examiner—Peter S. Wong
Assistant Examiner—Gregory J. Toatley, Jr.

[57] ABSTRACT

A base plate includes a planar member. Two rods extend from the planar member, each of the rods having a free end. A battery includes two bores there-through, the bores positioned and configured to receive the rods when the battery is positioned on the planar member. Two first terminals protrude from the planar member. Two second terminals are recessed within the battery and are configured and positioned to contact the first terminals when the battery is positioned on the planar member. Two third terminals are configured for connection to a vehicle's battery cables and are electrically connected to the first terminals. A cap threadedly connects to the free end each rod to secure the battery on the base plate.

12 Claims, 4 Drawing Sheets

1

VEHICLE BATTERY

BACKGROUND

1. Field of Invention

This invention relates to a vehicle battery, more particularly to a battery which can be quickly removed from and installed in a vehicle.

2. Description of Prior Art

Vehicles that stand overnight for a substantial period of time in very cold climates often have problems starting. This is mainly due to the battery not functioning well when exposed to a very cold climate for an extended period of time. This problem could be eliminated if the battery could be removed from the vehicle and stored indoors. The removal of a battery from a present day vehicle often can be a difficult and time-consuming task. There exists a need for a battery that can be easily removed from and installed in a vehicle, so that the battery can be stored indoors, thereby preserving the charging power of the battery in cold climates.

SUMMARY

The apparatus of the present invention includes a base plate including a planar member. Two rods extend from the planar member, each of the rods having a free end. A battery includes two bores there-through, the bores positioned and configured to receive the rods when the battery is positioned on the planar member. Two first terminals protrude from the planar member. Two second terminals are recessed within the battery and are configured and positioned to contact the first terminals when the battery is positioned on the planar member. Two third terminals are configured for connection to a vehicle's battery cables and are electrically connected to the first terminals. A cap threadedly connects to the free end of each rod to secure the battery on the base plate.

Because the battery is easily removable and installable within the vehicle, the battery can be stored indoors, thereby preserving the charging power of the battery in cold climates, and extending the life of the battery. Because the battery can be stored indoors instead of within the vehicle, auto theft is discouraged. The battery may be used in cars, trucks, or other types of vehicles.

DETAILED DESCRIPTION

Figure 1:
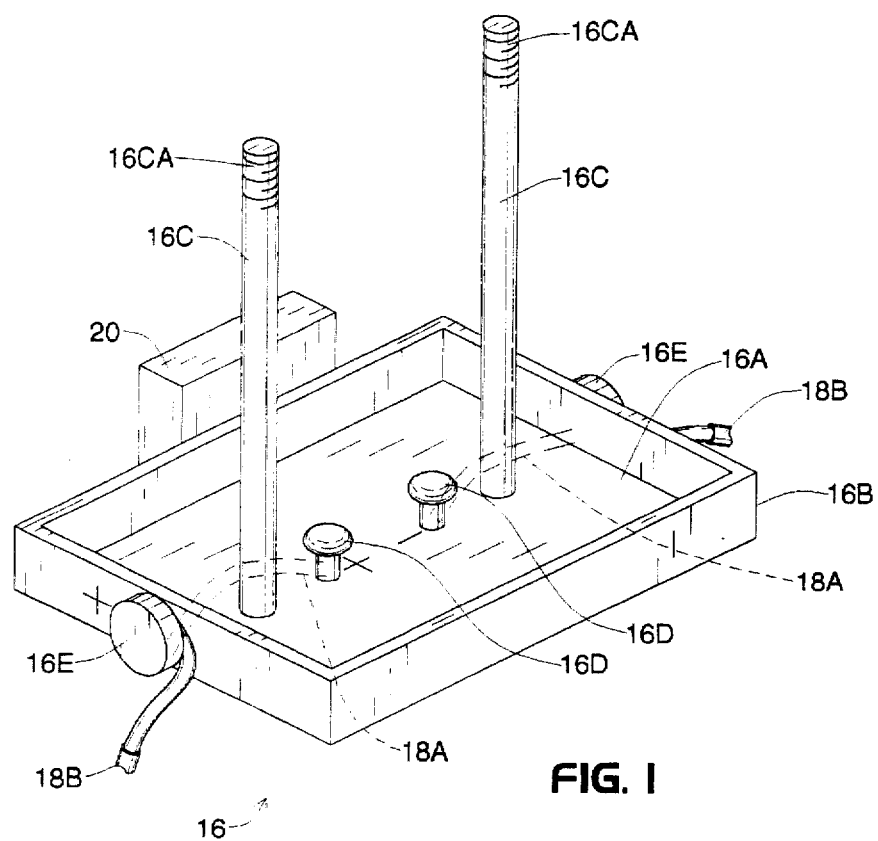
FIG. 1 is a perspective view of the base plate.
Figure 2:
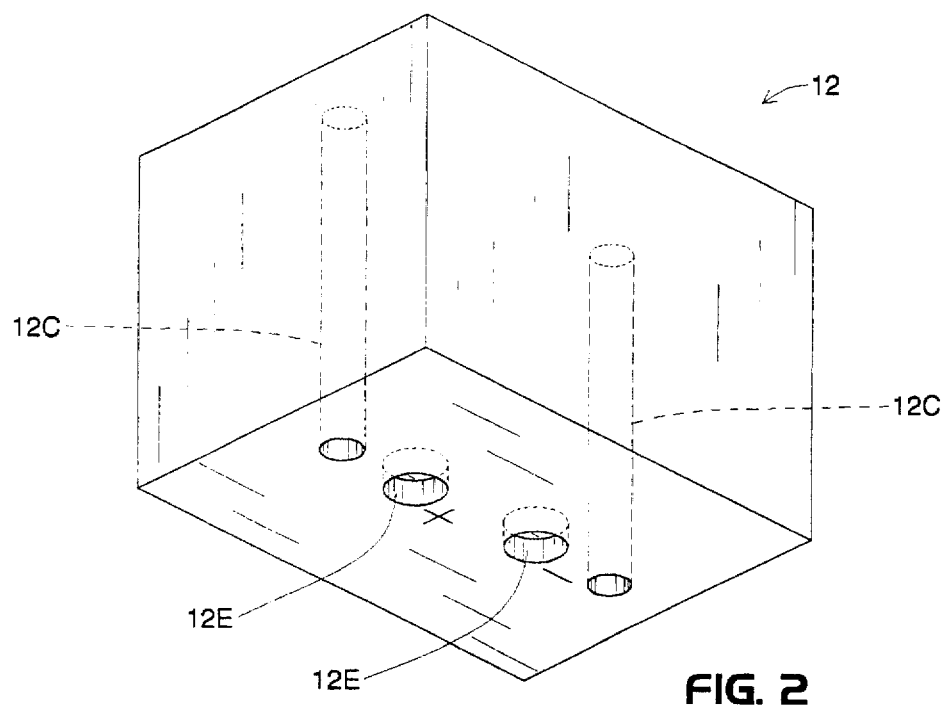
FIG. 2 is a perspective view of the battery.

FIG. 1 shows a base plate 16, and FIG. 2 shows a battery 12. The base plate 16 replaces the conventional battery mounting assembly (not shown) of a vehicle. The base plate 16 is configured to support and secure the battery 12.

The base plate 16 includes a substantially rectangular planar member 16A. A lip 16B is disposed about the perimeter of the planar member 16A. The lip 16B extends outwardly at a right angle from the planar member 16A. The lip 16B restrains the battery 12 from movement along the plane of the planar member 16A. Two positioning rods 16C extend outward at right angles from the planar member 16A. The positioning rods 16C help to secure and position the battery 12 within the base plate 16.

A pair of protruding terminals 16D protrude outwardly from the planar member 16A. The protruding terminals 16D are electrically connected via a pair of first cables 18A to side terminals 16E. The side terminals 16E are attached to the outside surface of the lip 16B. The side terminals 16E are connected to a pair of second cables 18B to transfer power to the vehicle's electrical system (not shown).

A power pack 20 is attached to the base plate 16. The power pack 20 will supply power to the vehicle's electrical equipment (not shown) such as the clock, radio memory and cabin lights when the battery 12 is removed from the vehicle. The power pack 20 may alternatively be built-in to the base plate 16.

Referring to FIG. 2, two positioning bores 12C extend through the battery 12. The bores 12C are configured and positioned to receive the positioning rods 16C when the battery 12 is positioned onto the base plate 16. The battery 12 includes a pair of recessed battery terminals 12E, which are configured and positioned to electrically connect with the protruding terminals 16D when the battery 12 is positioned on the base plate 16. Power is transmitted from the battery 12 through the battery terminals 12E to the protruding terminals 16D, then through the first cables 18A to the side terminals 16E, then through the second cables 18B to the vehicle's electrical system (not shown).

Figure 3:
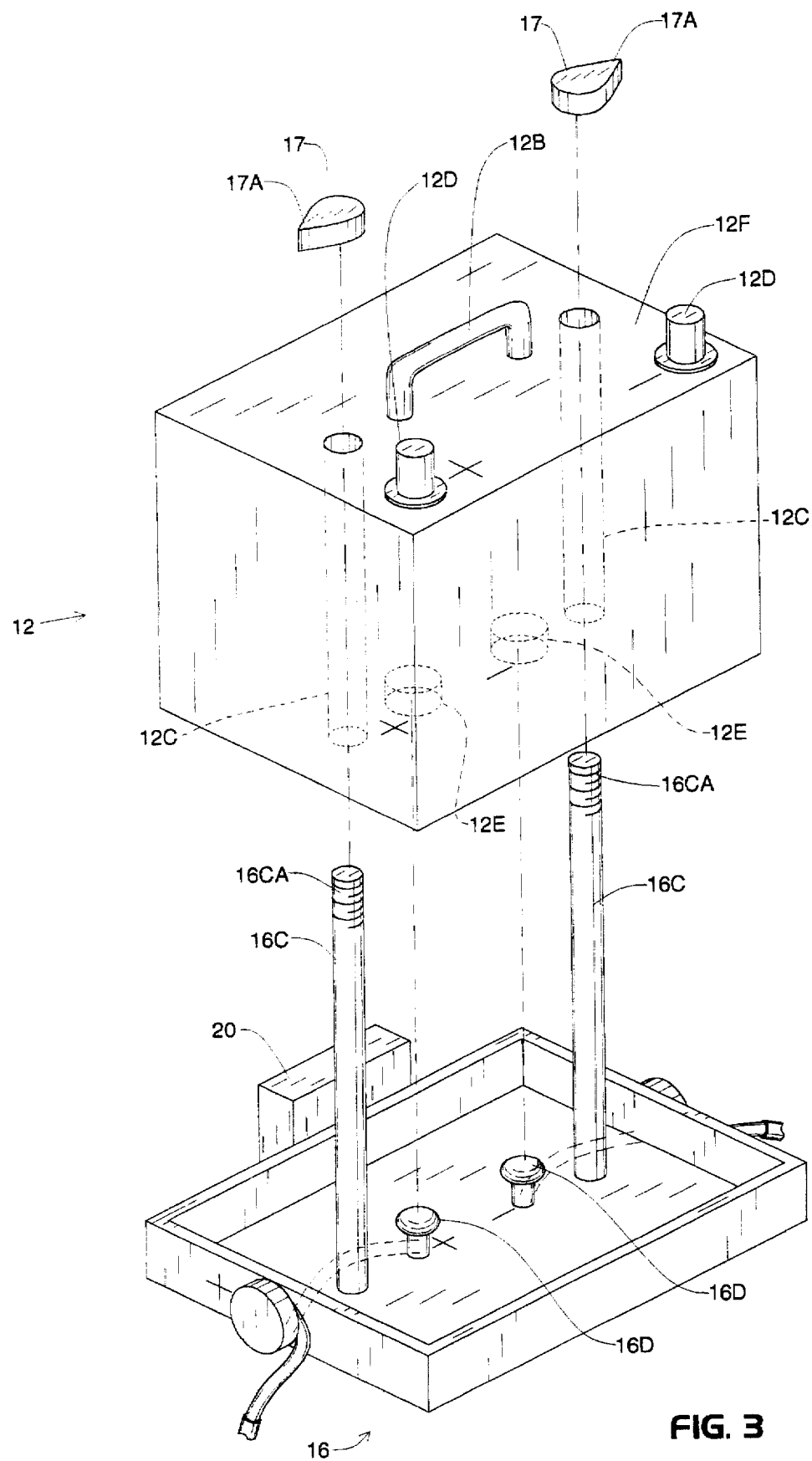
FIG. 3 is an exploded view of the battery and base plate.
Figure 4:
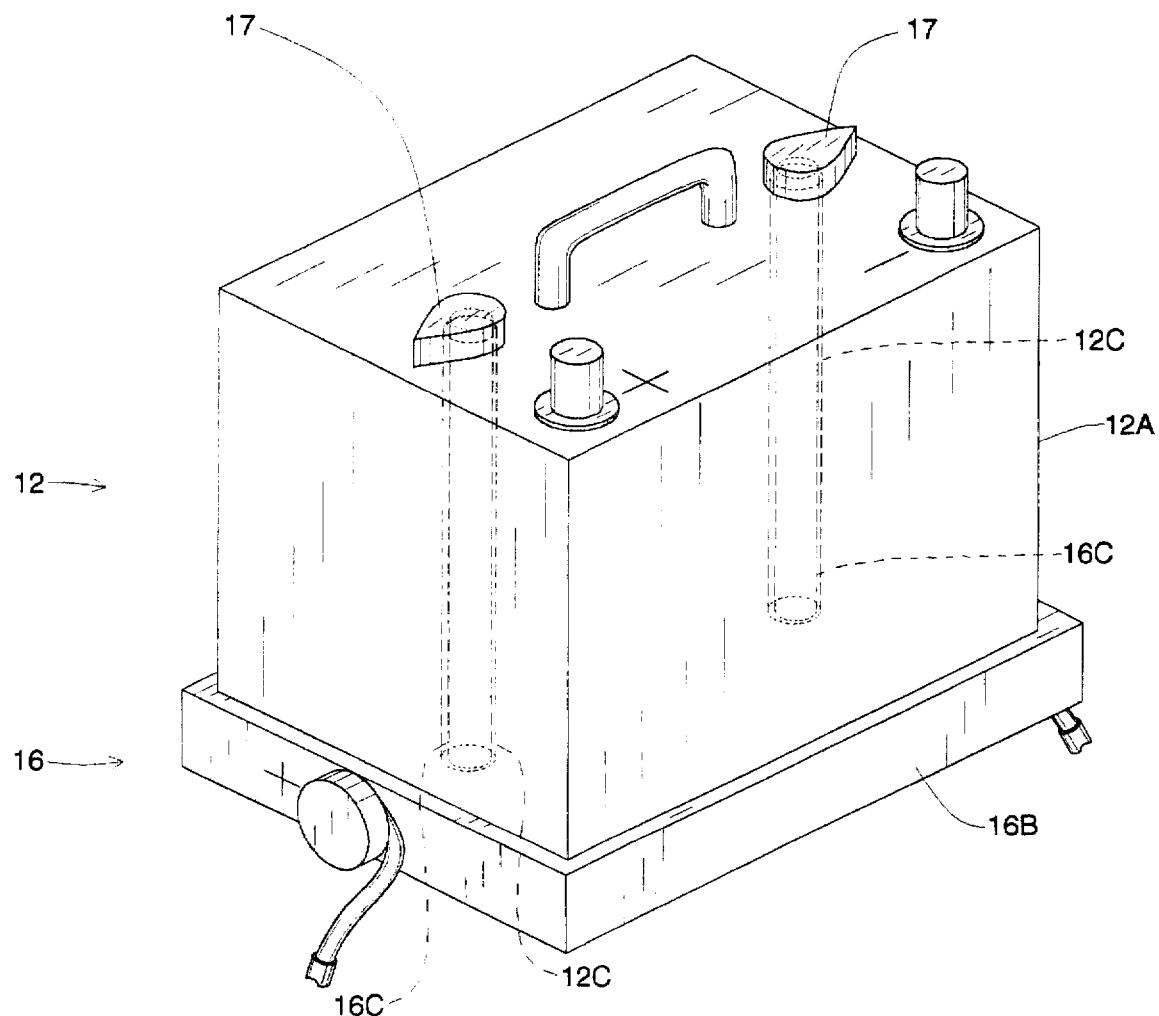
FIG. 4 is an assembled view of the battery and base plate.

FIG. 3 is an exploded view of the battery 12 and base plate 16, and FIG. 4 is an assembled view of the battery 12 and the base plate 16. The battery 12 includes a first side 12F, which faces upward and is disposed opposite of the base plate 16 when the battery 12 is secured to the base plate 16. A handle 12B is connected to the first side 12F of the battery 12 as an aid in the quick removal and installation of the battery 12, and for ease in carrying the battery 12. A pair of second battery terminals 12D extend upward from the first side 12F of the battery 12. The second battery terminals 12D are necessary because the recessed battery terminals 12E are not accessible when the battery 12 is positioned on the base plate 16. Thus, the second battery terminals 12D may be used for jump starting another vehicle or for re-charging the battery 12 without removing the battery 12 from the vehicle.

To secure the battery 12 on the base plate 16, the battery 12 is picked up by the handle 12B and raised above the base plate 16. The bores 12C are aligned with the positioning rods 16C, and the battery 12 is lowered onto the base plate 16. The positioning rods 16C are threaded at their free ends 16CA. Threaded caps 17 are threadedly engaged on the free ends 16CA of the positioning rods 16C after the battery 12 has been lowered onto the base plate 16, thereby securing the battery 12 on the base plate 16. The caps 17 each include an arm 17A extending radially there-from to aid in turning the caps 17 when engaging or disengaging the caps 17 from the positioning rods 16C. Preferably, the caps 17 and the positioning rods 16C are widely threaded so that the battery 12 can be secured with a minimum number of turns of the caps 17. The caps 17 may be attached to the battery 12 by plastic brackets (not shown) so that the caps 17 will not be dropped or misplaced during installation or removal of the battery 12.

The method of removing the battery 12 is precisely opposite of the installation process. This method of installing and removing the battery 12 is much easier and quicker than the method required for a conventional battery, which requires cables to be attached or detached from such a conventional battery 12, using tools. Often, battery cables become corroded, making the job of removing them from a conventional battery even more difficult.

Figure 5:
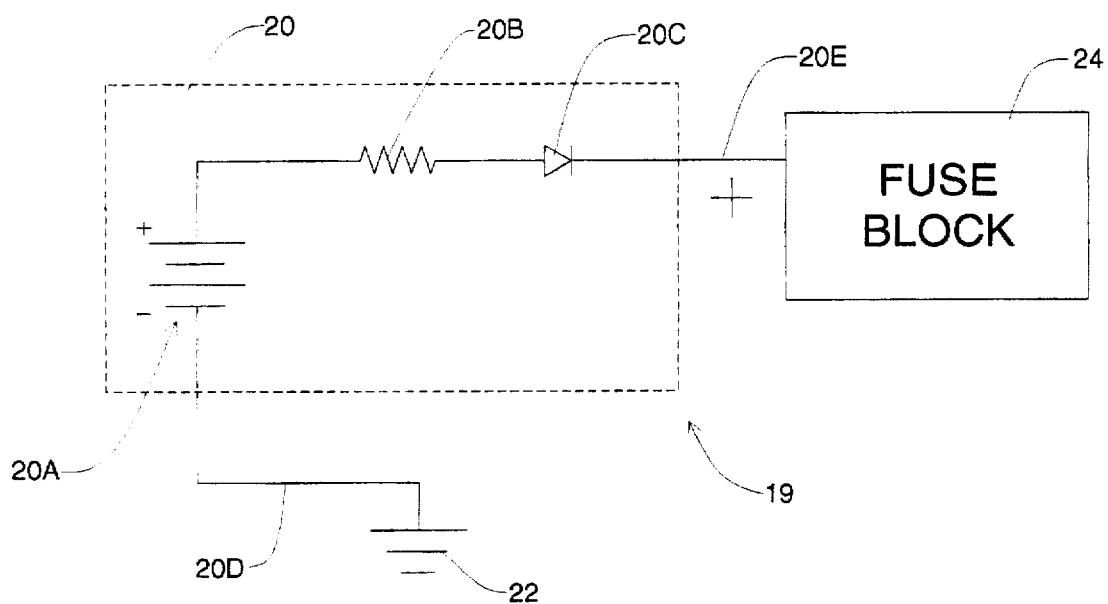
FIG. 5 is a schematic of the back-up power circuit.

FIG. 5 is a schematic of a back-up power circuit 19, which includes a back-up battery 20A sized to provide sufficient power to run the vehicle's electrical equipment (not shown) such as the clock, radio memory and cabin lights when the battery 12 is removed from the vehicle. A negative lead 20D attached to the negative terminal of the back-up battery 20A is run to ground 22. The back-up battery 20A is connected in series with a resistor 20B and a diode 20C. The resistor 20B prevents large currents from being drawn from the back-up battery 20A while allowing enough current to maintain the clock, radio and cabin lights. The diode 20C blocks charging current from the vehicle's charging system and from the battery 12. The positive lead 20E of the back-up power circuit 19 is connected to the vehicle's fuse block 24.

In the preferred embodiment, the back-up battery 20A, the resistor 20B and the diode 20C are contained within the power pack 20.

Figure 6:
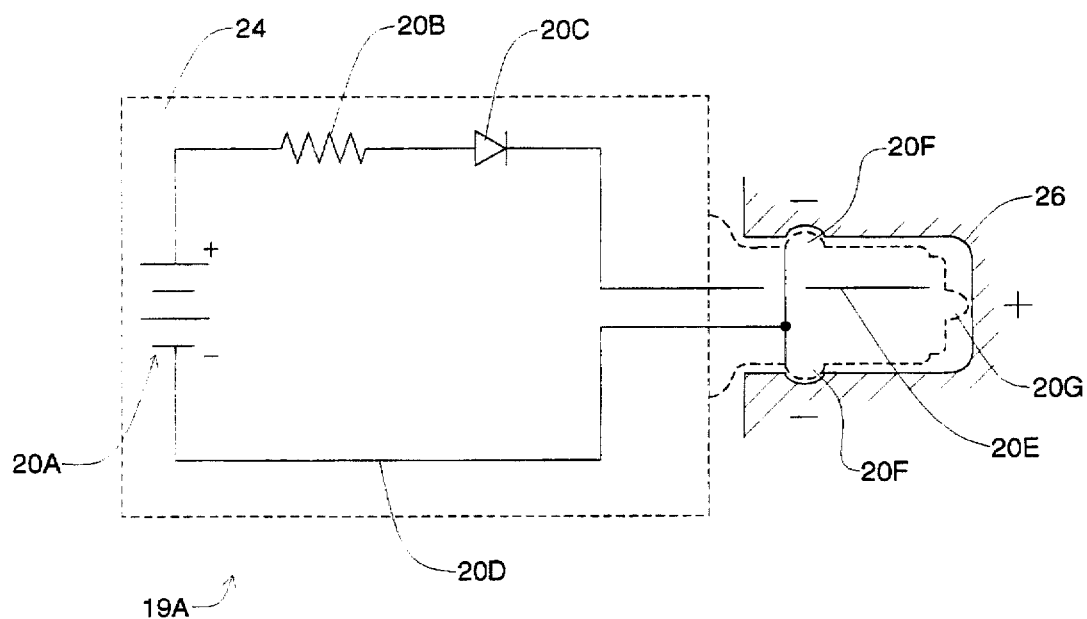
FIG. 6 is a schematic of an alternative back-up power circuit.

FIG. 6 is a schematic of an alternative back-up power circuit 19A, which is contained within a cigarette lighter receptacle plug 24, which is configured to fit within the vehicle's cigarette lighter receptacle 26. The alternative back-up power circuit 19A includes the back-up battery 20A. The negative lead 20D attached to the negative terminal of the back-up battery 20A is connected to the plug negative terminals 20F. The positive lead 20E of the alternative back-up power circuit 19A is connected to the plug positive terminal 20G. The back-up battery 20A, resistor 20B and diode 20C are similar in configuration and operation to the back-up power circuit 19.

Thus the apparatus of the present invention provides a battery 12 which is easily removable and installable within the vehicle, can be stored indoors, retains its charging power in cold climates, has a longer life, is easy to carry and discourages auto theft. The battery may be used in cars, trucks, or other type of vehicle.

While the above description contains many specifics, these should not be construed as limitations on the scope of the invention, but rather as an exemplification of one preferred embodiment thereof. Many variations are possible, for example:

a. the caps 17 and positioning rods 16C may be configured differently to accomplish a quick fastening of the battery 12 to the base plate 16 in a different manner, such as by a quick-connect coupling or other known method; and b. the negative and positive recessed battery terminals 12E may be of different sizes, and the protruding terminals 16D may be of corresponding sizes to ensure that the terminals are connected properly when the battery 12 is installed.

Accordingly, the scope of the invention should be determined not by the embodiment illustrated, but by the appended claims and their legal equivalents.

The invention claimed is:

1. A vehicle power system including:

a. a base plate including a planar member;

b. at least one rod extending from the planar member, the rod having a free end;

c. a battery having a bore there-through, the bore positioned and configured to receive the rod when the battery is positioned on the planar member;

d. two first terminals protruding from the planar member;

e. two second terminals recessed within the battery, the second terminals configured and positioned to contact the first terminals when the battery is positioned on the planar member;

f. two third terminals configured for connection to a vehicle's battery cables; the third terminals electrically connected to the first terminals; and g. at least one fastening means for connecting to the free end of the rod to secure the battery to the base plate.

2. The vehicle power system of claim 1, further including an alternate power means for providing power to such a vehicle's electrical system when the battery is removed from the base plate.

3. The vehicle power system of claim 2, wherein the alternate power means is connected to such a vehicle's fuse block and includes:

a. a back-up battery;

b. a means for preventing large currents from being drawn from the back-up battery; and c. a means for blocking charging current.

4. The vehicle power system of claim 2, wherein the alternate power means is contained within a plug for engaging with such a vehicle's cigarette lighter receptacle and includes:

a. a back-up battery;

b. a means for preventing large currents from being drawn from the back-up battery;

c. a means for blocking charging current;

d. a postive lead connected to a positive terminal of the plug; and e. a negative lead connected to a negative terminal of the plug.

5. A vehicle power system including:

a. a base plate;

b. at least one rod extending from the base plate, the rod having a free end;

c. a battery having a bore there through, the bore positioned and configured to receive the rod when the battery is positioned on the base plate;

d. two first terminals connected to the base plate;

e. two second terminals connected to the battery, the second terminals configured and positioned to contact the first terminals when the battery is positioned on the base plate;

f. two third terminals configured for connection to a vehicle's battery cables; the third terminals electrically connected to the first terminals; and g. at least one fastening means for connecting to the free end of the rod to secure the battery to the base plate.

6. The vehicle power system of claim 5, further including an alternate power means for providing power to such a vehicle's electrical system when the battery is removed from the base plate.

7. The vehicle power system of claim 6, wherein the alternate power means is connected to such a vehicle's fuse block and includes:

a. a back-up battery;

b. a means for preventing large currents from being drawn from the back-up battery; and c. a means for blocking charging current.

8. The vehicle power system of claim 6, wherein the alternate power means is contained within a plug for engaging with such a vehicle's cigarette lighter receptacle and includes:

a. a battery;

b. a base plate having a securing means for securing the battery thereto;

c. two first terminals connected to the base plate;

e. two second terminals connected to the battery, the second terminals configured and positioned to contact the first terminals when the battery is positioned on the base plate; and f. two third terminals configured for connection to a vehicle's battery cables; the third terminals electrically connected to the first terminals.

9. A vehicle power system including:

a. a base plate;

b. a number of rods extending from the base plate, each rod having a free end;

c. a battery having a number of bores there through such that each rod may pass through one of the bores when the battery is positioned on the base plate;

d. two first terminals protruding from the base plate;

e. two second terminals recessed within the battery, the second terminals configured and positioned to contact the first terminals when the battery is positioned on the base plate;

f. two third terminals configured for connection to a vehicle's battery cables; the third terminals electrically connected to the first terminals; and g. a fastening means for connecting to the free end of each rod to secure the battery to the base plate.

10. The vehicle power system of claim 9, further including an alternate power means for providing power to such a vehicle's electrical system when the battery is removed from the base plate.

11. The vehicle power system of claim 10, wherein the alternate power means is connected to such a vehicle's fuse block and includes:

a. a back-up battery;

b. a means for preventing large currents from being drawn from the back-up battery; and c. a means for blocking charging current.

12. The vehicle power system of claim 10, wherein the alternate power means is contained within a plug for engaging with such a vehicle's cigarette lighter receptacle and includes:

a. a back-up battery;

b. a means for preventing large currents from being drawn from the back-up battery;

c. a means for blocking charging current;

d. a positive lead connected to a positive terminal of the plug; and e. a negative lead connected to a negative terminal of the plug.

* * * * *